Aug. 26, 1952     S. B. LIPPINCOTT     2,608,096
SELF-LEVELING TILTABLE VACUUM GAUGE

Filed April 14, 1951     3 Sheets-Sheet 1

Inventor:
Samuel B. Lippincott
BY Dudley B. Howard
Attorney.

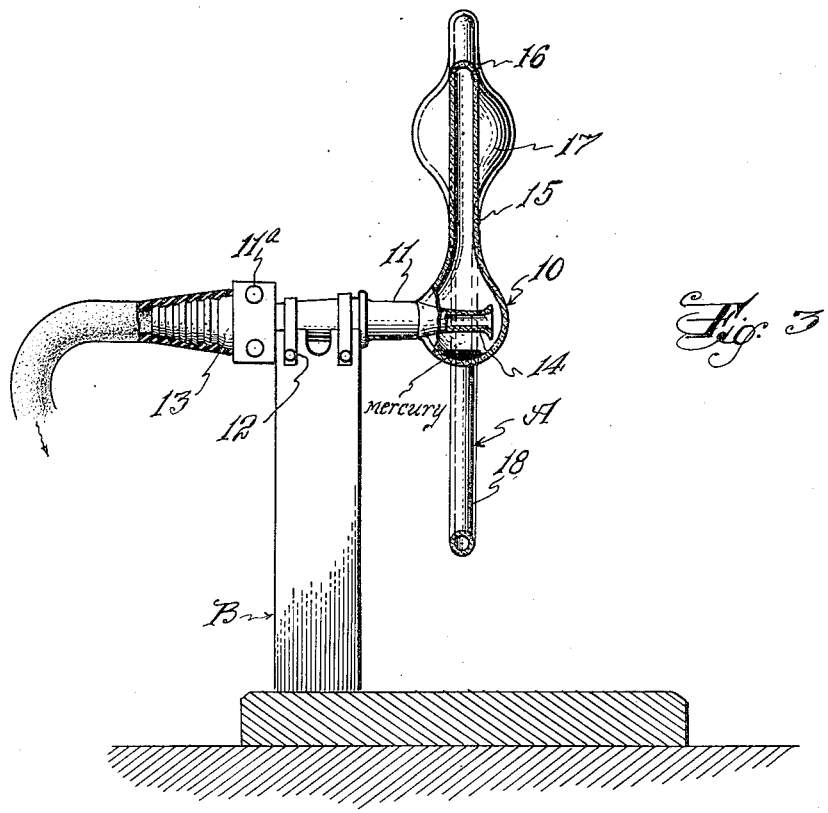
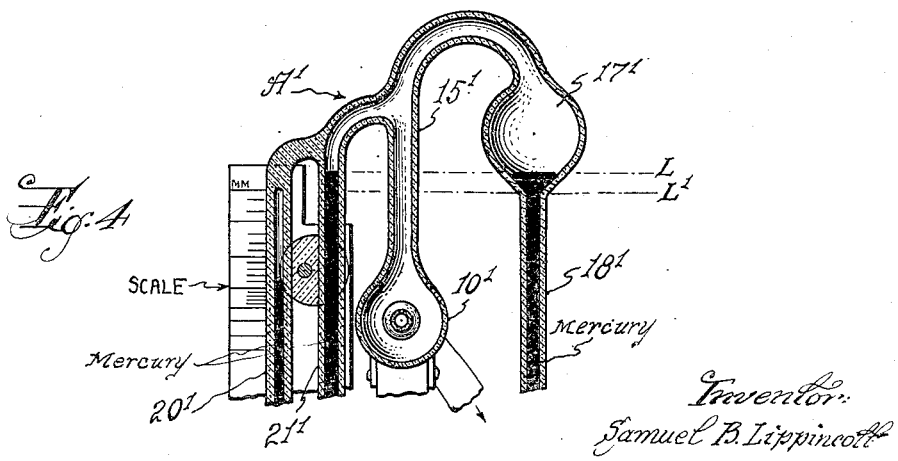

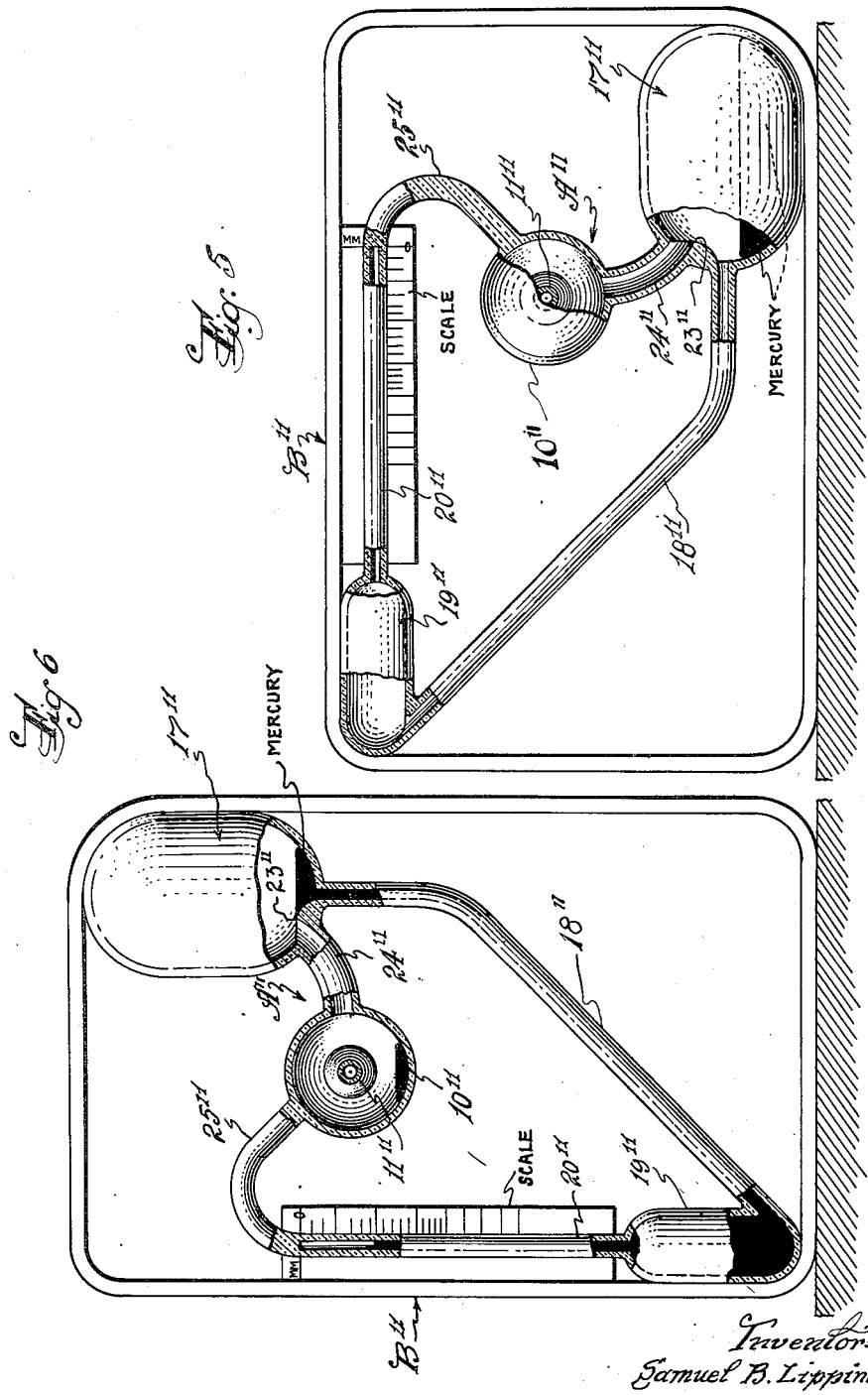

Patented Aug. 26, 1952

2,608,096

UNITED STATES PATENT OFFICE 2,608,096

SELF-LEVELING TILTABLE VACUUM GAUGE

Samuel B. Lippincott, Westfield, N. J.

Application April 14, 1951, Serial No. 221,093

12 Claims. (Cl. 73—400)

This invention relates in general to vacuum gauges of the McLeod type and has particular reference to that species of McLeod gauge wherein the mercury reservoir, the compression chamber with its appended reading tube with scale, and the other essential elements of the pressure measuring organization or system are assembled in fixed relation to each other in a small, compact, integral structure which is capable of being tilted between an upright reading position and a substantially horizontal pumping position.

Generally stated, the fundamental principle of any McLeod type gauge is that a measured volume of highly rarified gas which has been equilibrated with a vacuum chamber or line is compressed to a smaller volume in a scaled capillary reading tube by the pressure of a column of mercury, whereupon the length of that portion of the capillary reading tube which is occupied by the compressed volume of gas becomes an indication of the pressure in the vacuum chamber or line. Since the length of the compressed gas column is a function of pressure, the scale may be graduated in units of pressure or degrees of vacuum.

In vacuum gauges of this type, it is essential to accurate functioning of the reading tube that the top of the pressure-exerting or balancing column of mercury shall be on a level with the zero line of the reading scale. Whereas in the stationary species of McLeod gauge the required leveling of the mercury column may be accomplished by simply raising or lowering a freely movable mercury reservoir connected with the gauge by a flexible tube, leveling in the tiltable integrated species generally involves adjustment of the total volume of mercury in the internal system. Of course, it sometimes happens that the total volume of the mercury charge is just right, i. e., when the gauge structure is turned into upright reading position, the top of the mercury column will come to rest precisely on a level with the zero line of the scale. More frequently, however, the mercury level will be either too high or too low. This is most likely to occur when the instrument has been transferred from one industrial vacuum line to another in which there may be different degrees of vacuum. If the level be too high, precisely the correct amount of mercury will have to be withdrawn from the gauge to lower the level to the zero line of the scale. On the other hand, if the level be too low, more mercury must be added to the quantity already in the gauge. To do either of these things involves disconnection of the gauge from the vacuum line and tedious, careful procedure in removing mercury from the interior of the gauge or in admitting more, whichever may be required. If the first attempt at volume adjustment proves to be inaccurate, the entire procedure must be repeated as many times as may be necessary. It is a matter of guesswork each time and a great deal of time may be lost before a reading can be taken. The delay also is aggravated by the time required for the vacuum line to evacuate the atmospheric air that has entered the interior of the gauge at every disconnection of the gauge from the vacuum line.

It therefore is my primary object to improve upon the defective tiltable gauge by providing internal means for automatically adjusting the mercury level into coincidence with the zero line of the reading scale in conformity with the pressure condition in the vacuum line which exists at the moment the line-connected gauge structure is turned into reading position.

To be more explicit, I have provided for automatic subtraction of excess mercury from the total charge by a simple overflow method, assuming that the initial charge is too great. An insufficient volume of total mercury charge can only be corrected by the addition of more mercury to the system, but it is very easy to guard against that contingency by initially admitting a quantity of mercury that is considerably more than that actually required for proper leveling under the lowest vacuum line pressure conditions usually encountered. Then there always will be automatic overflow of an excess amount. The excess mercury is captivated in a chamber separate from the effective pressure measuring system and held therein until the pressure reading has been taken and the gauge structure has been tilted back from reading position into pumping or re-setting position, at which time the surplus mercury will gravitate back into the main mercury reservoir for absorption by the effective charge. The terms "effective pressure measuring system" and "effective charge" used above will be generally defined now and more specifically after the structural details of the gauge have been described more fully. By "effective pressure measuring system" is meant the combined parts of the over-all structural organization which contain the compressed gas and the pressure-balancing column or columns of mercury at the time of taking a pressure reading. The "effective charge" is the volume of mercury in the "effective system" from the time the required leveling off has been effected by overflow of the excess mercury until the oscillatory structure has been restored to pumping position.

Further objects and advantages will become apparent as the following specific description is read in connection with the accompanying drawings, in which:

Fig. 3 is a vertical cross-sectional view on line 3—3 of Fig. 2;

Fig. 4 is a transverse vertical cross-sectional view of the upper half of the superseded tiltable gauge structure, showing a commonly encountered condition wherein the mercury level is prohibitively high;

Fig. 5 is a front elevation, partly in section, of a modified form of the improved gauge, showing the tiltable structure in pumping position; and Fig. 6 is a similar view, showing the tiltable structure in reading position.

Figure 1:
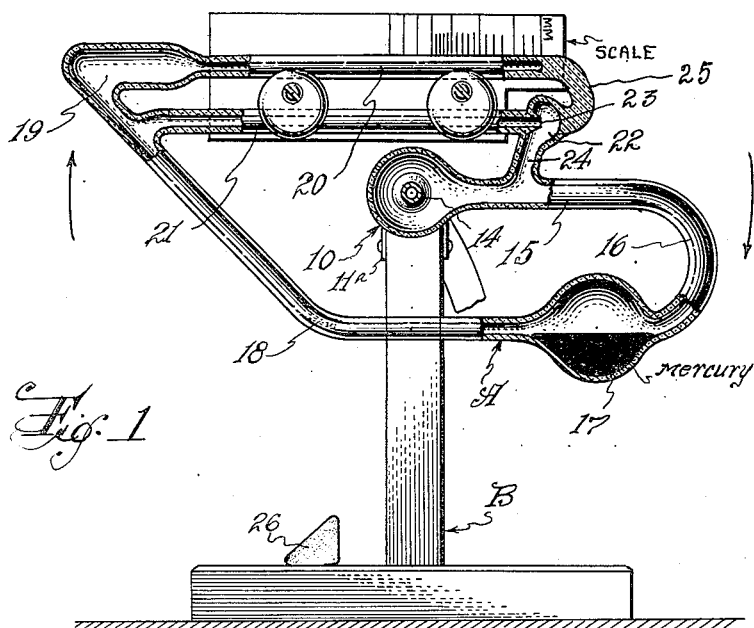
Fig. 1 is a front elevation of the preferred embodiment of the improved gauge, partly in section, showing the tiltable structure in pumping position.
Figure 2:
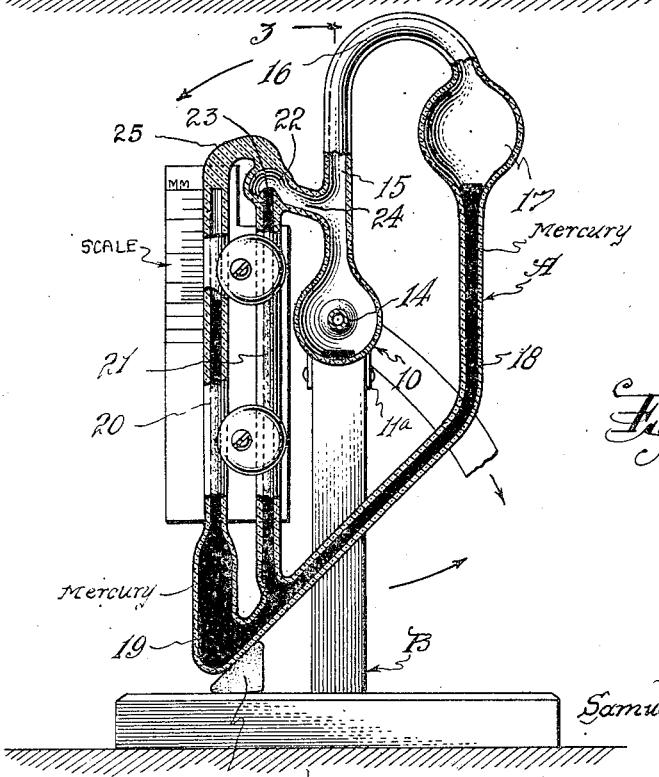
Fig. 2 is a similar view showing the tiltable structure after being turned into reading position.

Referring now in detail to Figures 1 to 3 of the drawings, wherein like reference characters indicate corresponding parts in the several views, a particular make of tiltable gauge to which I have applied my improvement feature comprises the two principal components shown, viz: tiltable gauge structure A and supporting member B on which the former is pivotally mounted and which may take the form of a stand adapted to rest in a stationary position on a convenient horizontal supporting surface, as shown.

Tiltable gauge structure A is constructed preferably entirely of clear glass, which is readily blown, molded and fused into the required form and which possesses the advantage of exposing the mercury contents to visual inspection. It is to be understood, however, that any other suitable material such as plastic may be used. Moreover, it should be within the skill of persons familiar with the art to produce the essential system of chambers, passages and ducts by methods other than by fusing together an assembled collection of bulbs, tubes, and the like. It is quite conceivable that the intercommunicating chambers and passages may be formed in solid blocks of glass or plastic material (not shown) by well known production methods. The illustrated embodiment represents one commonly practiced way of making such a structure and will be described by way of example.

As in the superseded model, structure A is composed of various chambers and interconnecting tubes or ducts which, roughly speaking, lie in the same plane and which are arranged around the pivotal axis in the peripheral shape of an irregular but fairly well-balanced ring. At the approximate center of this ring-shaped organization of parts is a hub portion formed by a preferably spherical trap chamber 10, which performs numerous useful functions that will appear as the description progresses.

Affixed to trap chamber 10, as convenient means for pivotally mounting the gauge structure and for establishing connection with a vacuum line, is an open-ended tubular bearing shaft 11, also preferably made of glass, which projects axially rearward from said chamber. As illustrated in Fig. 3, this bearing shaft 11 is rearwardly tapered and is journaled in the correspondingly tapered supporting bearing 12 provided at the top of supporting member B. In order to secure shaft 11 against longitudinal displacement in bearing 12, a clamp collar 11a has been fitted on the rearwardly protruding portion of said shaft. A terminal nipple 13 is provided on shaft 11 for engagement with the intake end of a flexible connecting hose leading to the manifold or other part of the vacuum line (not shown) whose internal pressure is to be measured by the gauge. The front end of bearing shaft 11 has been extended into the interior axial area of trap chamber 10 to form a trap tube 14, which should project, as shown, beyond the center of said chamber for the purpose of guarding against entrance of mercury splash into the bore of shaft 11.

Attention is now invited to Fig. 2 in particular in order that all terms about to be used to denote relative positions of parts will be understood to have reference to the upright reading position of the tiltable gauge structure represented therein. It will be observed in Fig. 2 that a large-bore tubular arm 15 projects radially upward from trap chamber 10 in communication with the interior thereof. Structurally, arm 15 serves to support rigidly upon trap chamber 10 all other parts which move with the latter about its pivotal axis. At the upper end of arm 15, a tubular reentrant goose-neck 16 establishes communication between the interior of said arm and the top of a preferably pear-shaped mercury reservoir 17. A comparatively long mercury conducting tube 18, preferably of capillary but not necessarily precision bore, extends angularly from the bottom of reservoir 17 to a position generally diametrically opposite to said reservoir, where it opens into the bottom of a compression chamber 19 which is supported by said conducting tube in a vertical position. The top of comparatively large-capacity compression chamber 19 communicates with a surmounting substantially vertical capillary tube 20. The internal bore of tube 20 is disposed in continuation of the interior of compression chamber 19 and has its upper end closed. This tube 20 constitutes the reading tube of the gauge and is paralleled by a capillary level determination tube 21 which has both ends open. It is considered to be quite essential that reading tube 20 shall have a precision bore and usually both tubes 20 and 21 have precision bores although not necessarily of the same diameter. The lower end of level determination tube 21 is in communication with the interior of conducting tube 18 closely adjacent to the union of the latter with the bottom of compression chamber 19 and is rigidly supported by said tube 18.

Up to this point in the disclosure, the structure of the improved gauge is practically identical with the earlier superseded model. Referring now to Fig. 4, the defective parts of the said earlier model, which complete the structure thereof, will now be described before proceeding with disclosure of the substituted improved parts.

It will be observed in Fig. 4 that the upper end of tube 21' extends to an indefinite distance above the level of the closed upper end of the bore of reading tube 20', where it is slightly enlarged from capillary gauge and is curved upwardly and laterally toward arm 15', with which it communicates at a point substantially as high as the top of reservoir 17'. Communication of tube 21' with the interior of arm 15' is intended to permit passage of the low pressure gas of the vacuum line and also to permit draining of mercury from tube 21' back into reservoir 17' by way of trap chamber 10' only after a pressure reading has been taken and the tiltable gauge structure A' has been restored to pumping position. It definitely is not intended that any of the mercury in tube 21' shall overflow into trap chamber 10' while the gauge structure is in upright reading position. In fact, such an occurrence is impossible because the mercury in tube 21' could not rise to a level higher than that of the mercury contents of reservoir 17' and conducting tube 18', which will always be lower than the upper end of said tube 21' where it joins arm 15'. Therefore, tube 21' cannot serve as a level determination tube. On the contrary, in the earlier model, it is essential that the plane of juncture between the upper end of conducting tube 18' and the bottom of reservoir 17' be disposed precisely on a level with the closed upper end of the bore of reading tube 20' and that the volume of mercury in the gauge be adjusted until the top of the column in conducting tube 18' is on a level with that plane of juncture.

The point of novelty in the improved gauge resides in the changed construction of the upper end portion of tube 21' of the earlier model and the mode of connection of this tube with arm 15', whereby tube 21 of the improved gauge is converted into a level determination tube. Referring again to Fig. 2, for reasons previously stated, it will be observed that the upper portion of level determination tube 21 has been cut off perpendicular to the tube axis precisely on a level with the closed upper end of the bore of reading tube 20 and caused to project into an overflow bulb 22. At the area of penetration of the bottom wall of overflow bulb 22 by level determination tube 21, these two structural elements are hermetically united as by fusing. The upper end of tube 21 preferably is tapered as shown to provide a sharply defined overflow brim 23 which will produce a clean break in the top of the mercury column in said tube as the last vestige of excess mercury overflows in a manner to be explained more fully hereinafter. A downwardly inclined drain duct 24 leads from the lowest portion of overflow bulb 22 into arm 15 and thereby serves to drain excess mercury into trap chamber 10 where it will be captivated and kept separate from the proportionately reduced effective charge of mercury in the effective pressure measuring system.

It now is appropriate to explain more specifically that the "effective charge" is the volume of mercury represented in solid black in Fig. 2 as being contained in any of parts 17—18—19—20—21, which latter constitute the "effective pressure measuring system" and are distinct from overflow bulb 22, drain duct 24, arm 15, trap chamber 10, shaft 11, and gooseneck 16. The total initial charge equals the effective charge plus the surplus which overflows into trap chamber 10.

Referring again to Fig. 2, it will be observed that, in order to increase the rigidity of reading tube 20, the upper end thereof is joined to the top of overflow bulb 22 by a conformably shaped solid glass rod section 25.

A pressure-reading scale is removably attached to tiltable gauge structure A in appropriate relation to reading tube 20, wherein the zero line of said scale coincides with the closed upper end of the capillary bore in said tube. Due to the fact that there are a number of so-called "types" of the tiltable gauge which correspond respectively to the usual pressure ranges in different industrial vacuum lines or laboratory apparatus, there is a standard scale suitably graduated for each type. For example, type A has a standard scale graduated for a pressure range of 0 to 1.0 m. m. of mercury. In the manufacture of the different types, it is the practice to adhere to the same diameter for the bore of level determination tube 21 but to vary the diameter of the bore of reading tube 20 proportionately with the different vacuum line pressure ranges for which the standard types A, B, C, etc., are designed.

In the event that production inspection reveals a gauge in which the brim 23 of level determination tube 21 is not at the precisely intended predetermined level relative to the closed upper end of the reading tube bore, viz.: a level preferably coincident with said closed end of the bore, it is not necessary to reject the defective gauge, provided the discrepancy in brim location is slight. Instead, a specially calibrated scale may be prepared to correct the discrepancy and be used in substitution for a standard scale. Incidentally, whenever the term "predetermined level relative to the closed upper end of the reading tube" is used hereinafter it means either the same level as that of the closed upper end of the reading tube, or a level so slightly deviating from the latter that correction may be made by special scale calibration.

In order to insure accuracy in stopping the tiltable gauge structure A at its upright reading position (Fig. 2) when swung in counter-clockwise direction from pumping position, a stop abutment 26 has been provided on the base of supporting member B for limiting engagement with the most suitable part of said gauge structure, which is the lower portion of compression chamber 19. Due to this provision, the operator's visual attention may be focused on the reading scale while the gauge structure is being moved into reading position, thereby making an almost instantaneous reading possible. It should be clearly apparent in Fig. 2 that, after gauge structure A has been held against stop abutment 26 long enough for the mercury charge to have flowed to the position shown, the center of gravity of said structure will have become located at a point which will tend to maintain the latter in upright reading position without any manual assistance. When the gauge structure subsequently is returned by manual operation to pumping position (Fig. 1) and is released from the grasp, it will become balanced in substantially the position shown as soon as the mercury charge has drained back into reservoir 17.

The operation of the gauge should be readily understood upon reference now to Figs. 1 and 2 in succession. After the portable instrument as a whole has been set up on a horizontal supporting surface adjacent to the connecting hose of the particular vacuum line to be tested for pressure, the hose is affixed securely to nipple 13. With tiltable gauge structure A in the position shown in Fig. 1, all or nearly all of the mercury charge will gravitate into reservoir 17. If some of the mercury remains in trap chamber 10 or other locations, it is only necessary to rock the gauge structure to a slight degree either way from the Fig. 1 position in order to release the trapped portions of the charge for gravitation into reservoir 17. In this pumping position, the vacuum in the line will be free to exert suction on the entire interior cavity of tiltable gauge structure A, whereby all atmospheric air which has entered the said interior will be evacuated very quickly. Moreover, compression chamber 19 and reading tube 20 will be subjected to an internal pressure equal to that of the vacuum line as soon as all atmospheric air has been evacuated. When it is judged that this condition has been effected, the tiltable gauge structure may be turned counter-clockwise into reading position. (Fig. 2.)

Assuming that the initially admitted total mercury charge is considerably greater in volume than the effective charge, in accordance with the plan of operation, mercury from reservoir 17 will gravitate through conducting tube 18 to the base of compression chamber 19. As the descending mercury stream passes the lower end of level determination tube 21, it will lock all gas beyond this point against escape through said tube 21. Further progress of the mercury will compress the locked gas first in large capacity compression chamber 19 and then to an ever increasing degree of compression in capillary reading tube 20 as the mercury rises therein. While this is happening, a branch of the mercury stream in conducting tube 18 will rise in level determination tube 21 to the level of overflow brim 23. Thereafter, there will be overflow of mercury into overflow bulb 22 and thence through drain duct 24 and arm 15 into trap chamber 10 until the rise of mercury in reading tube 20 has ceased. At this instant, the pressure of the gas captivated in reading tube 20 will be balanced by a column of mercury in level determination tube 21 extending from overflow brim 23 down to the level of the top of the mercury column in reading tube 20. The length of this column in level determination tube 21 will depend upon the original pressure of the gas from the vacuum line as it entered compression chamber 19 and reading tube 20 when the tiltable gauge structure was in the pumping position of Fig. 1. In other words, if the degree of vacuum in the line be high (pressure low), a shorter column of mercury will balance the pressure in reading tube 20 than if the degree of vacuum were lower (pressure high). Since the level of overflow brim 23 coincides with the level of the upper closed end of the reading tube bore and thus with the zero line of the reading scale, it would be possible to measure the height of the pressure-balancing column of mercury in level determination tube by use of the scale if the latter were graduated in units of linear measurement. Because the length of that column of mercury (also the coextensive length of gas-filled reading tube bore) is a function of pressure in the vacuum line and that is what is to be measured, the scale has been graduated in units of pressure measurement, such as millimeters or microns of mercury.

The overflow of mercury in excess of the effective charge required to create the pressure-balancing condition shown in Fig. 2 takes place in a second of time or less, so the reading of pressure by use of the scale associated with reading tube 20 may be accomplished immediately upon tilting of the gauge structure from pumping position into reading position, because the automatic or self-leveling occurs in the time it takes for the operator to focus attention on the reading scale. Having taken the reading, the tiltable gauge structure may be tilted back into the pumping or re-setting position of Fig. 1.

The almost instantaneous leveling and reading operation just described may be contrasted with the tedious, time-consuming operation of the earlier species of tiltable gauge illustrated in Fig. 4. In that case, if the mercury charge be at level L, when the gauge is tilted into the reading position shown, no accurate pressure reading is possible until the mercury level has been lowered to line L'. Such volume adjustment requires, as the first step at least, disconnection of the connecting hose from nipple 13 after the vacuum line has been turned off, provided means for doing so exists, and overturning the entire instrument onto its front face, in order to permit removal by suction of a quantity of mercury which is guessed to amount to the dispensable excess. Thereupon, the instrument is again erected in upright position, the connecting hose is re-connected, and the vacuum line is re-opened. If, after allowing time for pumping out the leaked-in atmospheric air and then tilting the gauge structure into reading position, it be found that the mercury level is still too high, or has been reduced below level L', the adjustment procedure has to be repeated at least once more until proper leveling has been accomplished.

In addition to the obvious advantage of automatic leveling, there is another advantage which particularly affects the cost of manufacture. For instance, in the earlier tiltable gauge of Fig. 4, it was mandatory that the plane of juncture between the bottom of reservoir 17' and the upper end of the capillary bore of conducting tube 18' (line L') be on a precise level with the closed upper end of the bore of reading tube 20. Obviously, the production means and methods for insuring such precise positioning of the bottom of reservoir 17' and the requirement for careful production inspection of this detail added materially to the cost of manufacture. In the improved gauge, on the contrary, such precision is not necessary. The required predetermined level is achieved automatically by level determination tube 21, so it makes no difference whether the corresponding mercury level in the reservoir column is actually above the bottom of reservoir 17 itself or somewhere lower such as in conducting tube 18.

Figs. 5 and 6 represent a simplified modification of the improved self-leveling gauge, wherein tiltability of structure A'' has been shown by way of example as being achieved by encasing said structure in a supporting member B'', which may be in the form of a substantially rectangular frame adapted to be rested on one flat exterior side face thereof for pumping position (Fig. 5) or to be turned over onto the proper adjacent flat exterior side face for reading position (Fig. 6). In this turning or tilting movement, the line of bearing contact between the intervening corner of supporting member B'' constitutes the pivotal axis and differs from the general location of the pivotal axis in the embodiment illustrated in Figs. 1 and 2 in that it is outside the ring-like gauge structure A''. As a result, the center of gravity of the gauge will shift across the axis when tilting in either direction occurs and will serve to maintain the gauge in the newly assumed position until manually tilted back to the original position.

The modified gauge differs from the preferred embodiment of Figs. 1 to 3 in the elimination of tube 21. The level-determination means which has been substituted for tube 21 will be described presently.

Referring now to Fig. 6, which shows the tiltable gauge structure A'' in its upright reading position, it will be observed that mercury reservoir 17'' is located in the usual elevated relation to compression chamber 19''. A capillary tube 18'' leads from the bottom of reservoir 17'' to the bottom of compression chamber 19''. Said chamber 19'' is surmounted in the usual manner by capillary precision-bore reading tube 20'', which has the upper end of its bore closed. A pressure-reading scale is detachably mounted as shown lengthwise of reading tube 20″ with its zero line coinciding with the closed upper end of the tube bore.

In this embodiment of the invention, tube 18″ serves both as conducting means for mercury gravitation and gas pressure equilibration and as a level determination tube. For the latter purpose, the upper end of tube 18″ is provided with a sharply defined overflow brim 23″ at the left side of the vertical axis of reservoir 17″. Overflow brim 23″ is elevated above the bottom of reservoir 17″ so that the mercury charge in said reservoir will tend to flow down through tube 18″ into compression chamber 19″ when the gauge is tilted counter-clockwise from the pumping position of Fig. 5 into the reading position of Fig. 6. Overflow brim 23 preferably is located precisely on a level with the closed upper end of the bore of reading tube 20″. However, as in the preferred embodiment, overflow brim 23″ may be at some such predetermined level relative to the upper end of the reading tube bore that correction for the disparity can be made by special scale calibration.

The parts 17″—18″—19″—20″ just described constitute the "effective pressure measuring system" defined hereinbefore. Separated from the said "effective system" is the usual trap chamber 10″, which is adapted to be connected through the medium of tube 11″ with a vacuum line to be tested in the well known manner. In order to permit drainage of overflowing mercury in excess of the "effective charge" in the "effective system" into trap chamber 10″ at the time of taking a pressure reading (Fig. 6) or to permit return of previously trapped excess mercury from said chamber 10″ into reservoir 17″ upon restoration of the gauge to pumping position (Fig. 5), an inclined drainage duct 24″ is provided in a position and arrangement wherein it leads downward into the right side portion of trap chamber 10″ from the bottom area of reservoir 17″ located on the opposite (left) side of overflow brim 23″ with respect to the upper end of the bore of tube 18″.

To increase the rigidity of the gauge structure, the upper end of reading tube 20″ may be connected to trap chamber 10″ by a solid glass rod 25″ as shown.

The operation of the modified gauge is fundamentally the same as with the preferred form illustrated in Figs. 1 to 3. The total charge of mercury admitted to reservoir 17″ is considerably more than the quantity actually required for proper leveling under the lowest vacuum line pressure conditions usually encountered, and reservoir 17″ has been designed so that the charge will not enter nor in any way mask the upper end of tube 18″ when the gauge is in pumping position. (Fig. 5.) This provision insures an unobstructed passage between trap chamber 10″ and compression chamber 19″, whereby equilibration of pressure within the effective pressure measuring system and the vacuum line is quickly attained when the latter has been connected to tube 11″. Now the gauge is ready to be tilted into reading position (Fig. 6), which may be accomplished by tipping supporting member B″ counter-clockwise over onto its adjacent side. This tilting movement cannot be done in the free, unconstrained manner permissible in handling the preferred form of gauge. Somewhat slower and more careful tilting movement is advisable to insure that all of the effective charge of mercury is poured down tube 18″ before any excess mercury passes into trap chamber 10″ through drain duct 24″.

As soon as any mercury enters the upper end of tube 18″, the essential gas lock condition in said tube 18″, compression chamber 19″, and reading tube 20″ is created. Thereafter, the locked gas will be compressed until its pressure balances a column of mercury the top of which is defined by overflow brim 23″ after all mercury in excess of the effective charge has overflowed into trap chamber 10″. The pressure reading may now be taken and the gauge may be tilted back into pumping position, whereupon the effective charge and the overflowed excess in trap chamber 10″ all will gravitate back into reservoir 17″.

It should be apparent that, instead of using supporting member B″ to mount gauge structure A″ tiltably on a supporting surface, tube 11″ may be pivotally supported in suitable bearing means just like the arrangement shown in Figs. 1 to 3. Two alternative means for tiltably mounting the gauge structure and for maintaining the same steadily in the respective tilted positions have been disclosed herein by way of illustration and it is to be understood that other equivalent means for the same purpose may be adopted without departing from the scope of the invention.

Having thus described the invention, I claim:

1. A McLeod type vacuum gauge including a supporting member, and a gauge structure of fixedly oriented parts mounted on said supporting member for pivotal movement on a horizontal axis whereby it may be tilted back and forth between upright reading position and substantially horizontal pumping position, said gauge structure in upright reading position comprising, in combination: a compression chamber surmounted by a vertical capillary reading tube having its bore in continuation of the interior of said chamber and closed at its upper end; a pressure-reading scale extending lengthwise of the reading tube with its zero line coinciding with the closed upper end of the tube bore; a level determination tube communicating with the bottom of the compression chamber and rising therefrom, said level determination tube being provided with an overflow brim located at a predetermined level in relation to the closed upper end of the reading tube; a trap chamber located at least partially lower than said overflow brim; gas passage means connecting the level determination tube with a vacuum line; a mercury reservoir communicating with the level determination tube and with the trap chamber and being located at least partially at a higher level than the level determination tube at its overflow brim and the trap chamber in reading position and lower than the trap chamber in pumping position; and duct means connecting said overflow brim with the trap chamber, said duct means being adapted to drain excess mercury which may overflow said overflow brim of the level determination tube into the trap chamber.

2. A McLeod type vacuum gauge structure as defined in claim 1, wherein the overflow brim of the level determination tube is disposed on a level with the closed upper end of the reading tube bore.

3. A McLeod type vacuum gauge structure as defined in claim 1, wherein the means for connecting the level determination tube with a vacuum line is a tube directly communicating with the trap chamber and said vacuum line.

4. A McLeod type vacuum gauge including a supporting member, and a gauge structure mounted on said supporting member for pivotal movement on a horizontal axis and being so constructed and arranged that the essential chambers and passages are intercommunicating whereever joined together and are fixed in relative positions, said gauge structure as a whole being adapted to be tilted back and forth between upright reading position and substantially horizontal pumping position and in upright reading position comprising, in combination: a compression chamber surmounted by a substantially vertical reading tube having a capillary bore in continuation of the interior of said chamber and which has its upper end closed; a pressure-reading scale extending lengthwise of the reading tube and having its zero line coinciding with the level of the closed upper end of the reading tube bore, a mercury reservoir adapted to contain a charge of mercury and located at least partially higher than the level of the closed upper end of the reading tube bore; a mercury conducting tube leading from the bottom of the reservoir to the bottom of the compression chamber; a capillary level determination tube disposed substantially parallel to the reading tube with its lower end connected to the conducting tube adjacent to the bottom of the compression chamber; the level determination tube being provided with an overflow brim disposed at a predetermined level relative to the closed upper end of the reading tube bore; a trap chamber disposed below the level of the overflow brim of the level determination tube and being adapted in the normal operation of the gauge to contain only such mercury as overflows said overflow brim; and duct means connecting said trap chamber to said level determination tube at its overflow brim and adapted to drain overflowing mercury from said overflow brim into said trap chamber; said chamber and said reservoir being adapted to communicate with vacuum being measured when the gauge is in pumping position.

5. A McLeod type vacuum gauge structure as defined in claim 4, wherein the upper end portion of the level determination tube with its overflow brim projects into an overflow bulb and said duct means comprising drainage means leading downward from said overflow bulb into the trap chamber.

6. A McLeod type vacuum gauge structure as defined in claim 4, wherein the overflow brim of the level determination tube projects into said duct means and is tapered in cross-section and thereby sharply defined to facilitate a clean break in overflowing mercury.

7. A McLeod type vacuum gauge structure as defined in claim 4, wherein the trap chamber is so located that it will be lower than the mercury reservoir when the gauge structure is in reading position and higher than said reservoir when in pumping position, and wherein means is provided adapted to drain trapped mercury from the trap chamber into the top of the reservoir when the gauge structure is tilted back from reading position into pumping position after completion of a pressure reading.

8. A McLeod type vacuum gauge including a supporting member, and a gauge structure mounted on said supporting member for pivotal movement on a horizontal axis and being so constructed and arranged that the essential chambers and passages are intercommunicating wherever joined together and are fixed in relative positions, said gauge structure as a whole being adapted to be tilted back and forth between upright reading position and substantially horizontal pumping position and in upright reading position comprising, in combination: a hub portion including a trap chamber of circular cross-section; means for connecting the central area of the trap chamber with a vacuum line; a tubular radial arm extending upward and outward from the peripheral portion of the trap chamber; a reservoir adapted to contain a mercury charge connected to the outer end of said radial arm; a conducting tube leading from the bottom of the reservoir below and beyond the trap chamber to a position substantially diametrically opposite to the reservoir; a compression chamber extending upward from the lower end of the conducting tube; a vertical capillary reading tube surmounting the compression chamber in continuation of the interior thereof and having the upper end of its bore closed; a pressure-reading scale extending lengthwise of said reading tube with its zero line coinciding with the level of the closed upper end of the bore thereof; a capillary level determination tube disposed substantially parallel to the reading tube and having its lower end connected to the conducting tube adjacent to the bottom of the compression chamber, the upper end portion of the level determination tube being provided at a predetermined level relative to the closed upper end of the reading tube bore and above the level of the trap chamber with an overflow brim; and duct means connecting said trap chamber to said level determination tube at its overflow brim and adapted to drain excess mercury which overflows said brim into the radial arm for delivery into the trap chamber.

9. A McLeod type vacuum gauge structure as defined in claim 8, wherein the overflow drainage means includes an overflow bulb into which the upper end of the level determination tube with its overflow brim projects, and said duct means comprises drainage means leading from the lowest portion of the overflow bulb downward into the radial arm.

10. A McLeod type vacuum gauge structure as defined in claim 1, wherein the mercury reservoir has its bottom in communication with the upper end of the level determination tube and enclosing the overflow brim thereof.

11. A McLeod type vacuum gauge structure as defined in claim 10, wherein the means adapted to drain excess mercury which may overflow the overflow brim of the level determination tube into the trap chamber is in the form of a drain duct leading from an area of the bottom portion of the mercury reservoir located on the opposite side of the overflow brim with respect to the upper end of the level determination tube downward into the trap chamber.

12. A McLeod type vacuum gauge structure as defined in claim 11, wherein the means for connecting the level determination tube with a vacuum line is a tube directly communicating with the trap chamber and said vacuum line.

SAMUEL B. LIPPINCOTT.

REFERENCES CITED

The following references are of record in the file of this patent:

UNITED STATES PATENTS

| Number | Name | Date |
|---|---|---|
| 676,178 | Davis | June 11, 1901 |
| 2,542,076 | Flosdorf | Feb. 20, 1951 |

FOREIGN PATENTS

| Number | Country | Date |
|---|---|---|
| 264,759 | Great Britain | Jan. 27, 1927 |